Aug. 26, 1969   J. E. SCHMIDT   3,463,672
BATTERY CONSTRUCTION
Filed Aug. 10, 1967   2 Sheets-Sheet 2
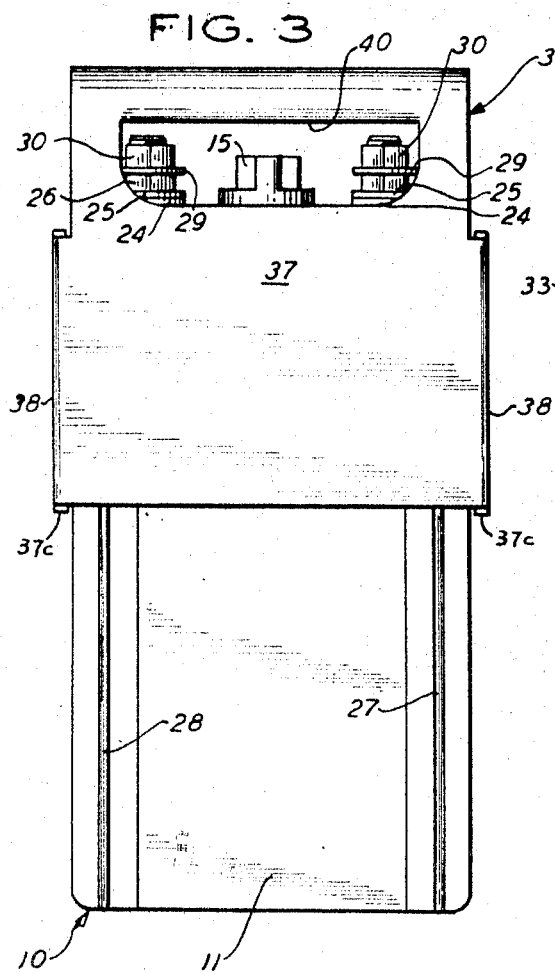
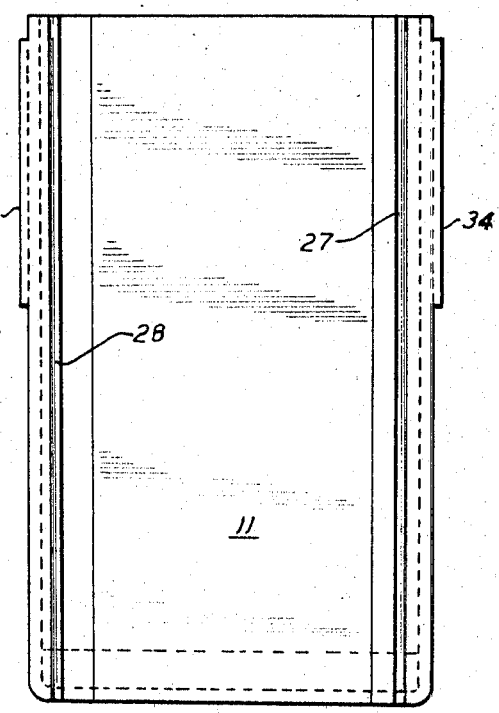
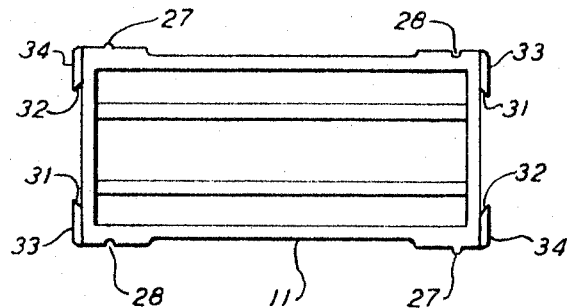
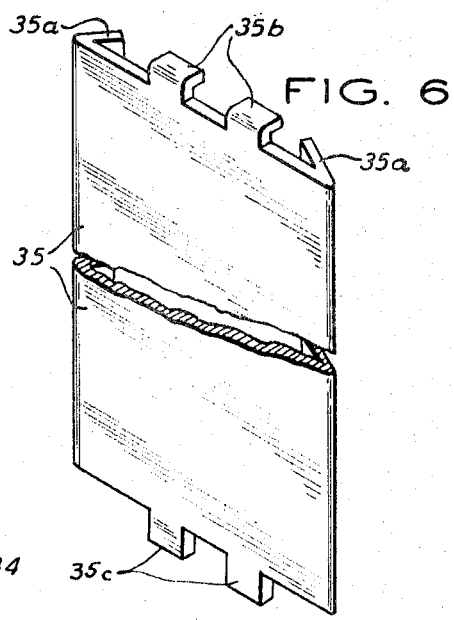
INVENTOR
JACOB E. SCHMIDT
BY George H. Fritzinger
AGENT United States Patent Office 3,463,672
Patented Aug. 26, 1969

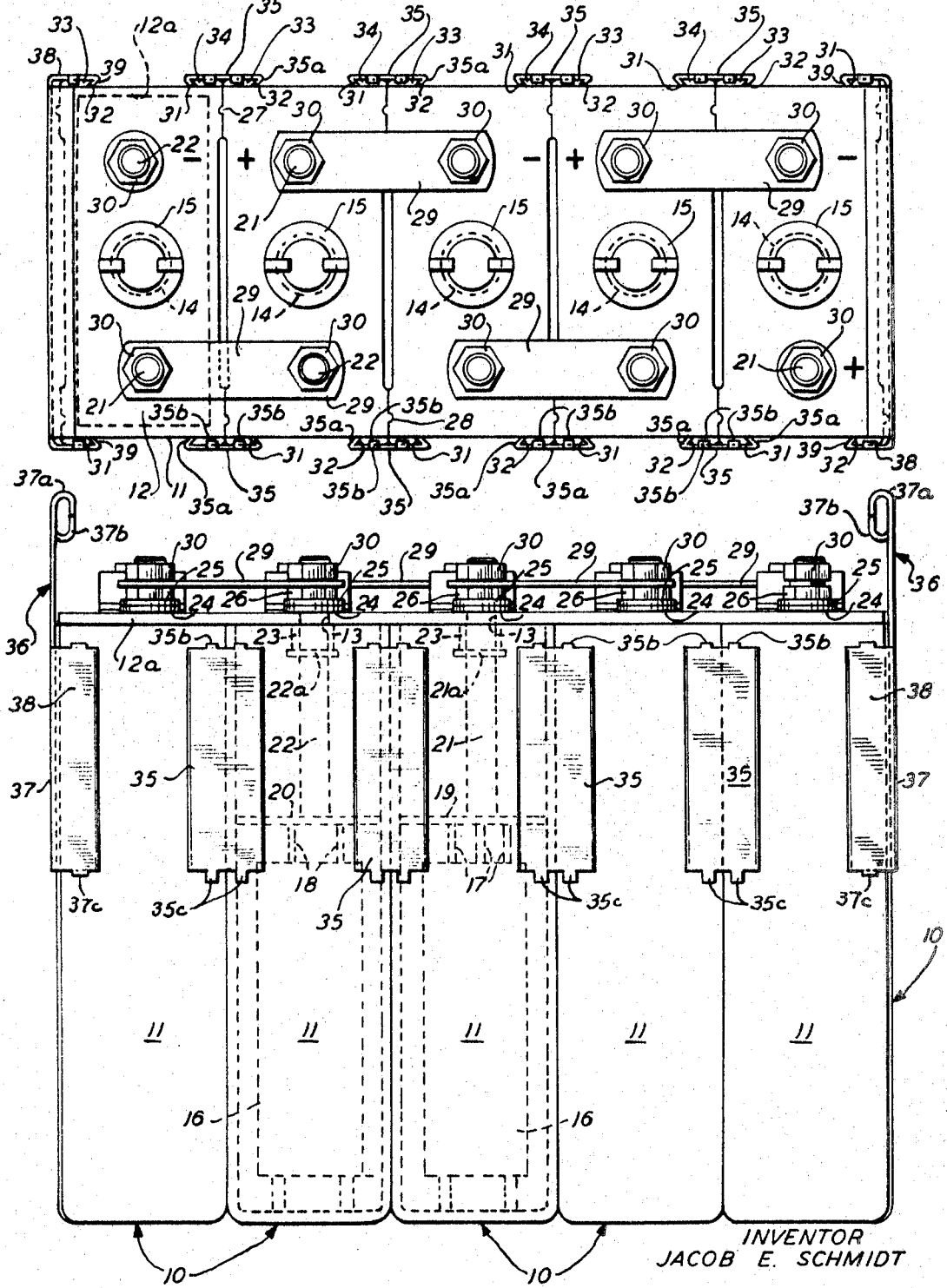

3,463,672
BATTERY CONSTRUCTION
Jacob E. Schmidt, Little Falls Township, Passaic County,
N.J., assignor to McGraw-Edison Company, Elgin, Ill.,
a corporation of Delaware
Filed Aug. 10, 1967, Ser. No. 659,645
Int. Cl. H01m 1/02
U.S. Cl. 136—166                                    2 Claims

ABSTRACT OF THE DISCLOSURE

This invention relates to a battery construction which permits any selected number of individual battery cells to be readily connected into a unitary structure. The case of each cell is provided with vertically extending undercut edges adjacent to its corner edges at its back and front sides so that when a group of cells are set side-by-side in a row they can be mechanically interconnected by slide clasps having hooked flanges which can be pressed onto the pairs of undercut edges of adjoining cells. The undercut edges are formed by providing ribs along the corner edges of the cells, and each clasp is adapted to embrace a pair of adjacent ribs of adjoining cells and to hook slidably onto the side walls thereof. Handles in the form of plate structures having hook-shaped side flanges are provided on the end walls of the row of cells by pressing the flanges slidably onto the ribs at the corners of the end cells.

An object of the invention is to provide a novel battery cell construction which permits any number of individual cells to be readily attached to each other in a row to form a rigid battery structure.

Another object is to provide a unitary battery structure of novel design comprising a plurality of such individual cells.

Other objects and features of the invention will be apparent from the following description and the appended claims.

In the description of my invention, reference is had to the accompanying drawings, of which:

FIGURE 1 is a plan view of a battery according to the invention;

FIGURE 2 is a front elevational view of this battery;

FIGURE 3 is an end view of this battery;

FIGURE 4 is a plan view of the case of an individual cell of the battery without the cover;

FIGURE 5 is a side view of the case of an individual cell; and

FIGURE 6 is a perspective view of a cell connector clasp for connecting together a pair of cells in a side-by-side arrangement.

The battery shown in the accompanying drawings comprises a plurality of individual cells 10 of which five are shown by way of illustrative example. The cells 10 have identical cases 11 open to the top and of a rectangular shape as viewed from the top and sides. The cases are preferably of a molded construction made as of clear plastic. The top of each case is closed by a plastic cover 12 having a flange or lip 12a which is cemented liquid-tight over the edge of the case. Each cover has two identical terminal-post openings 13 near the opposite ends thereof and a central filler opening 14. The filler opening may have internal grooves to receive a filler cap 15 in a bayonet type joint.

In the lower portion of each cell case there is a plate structure 16 comprising a plurality of positive and negative plates with intervening insulating spacers. The positive plates may have upright lugs 17 at one end of the plate structure and the negative plates may have similar lugs 18 at the other end. The sets of lugs 17 and 18 may be welded to respective horizontal connector plates 19 and 20. Welded to the connector plates 19 and 20 are respective upright posts 21 and 22 which have threaded portions extending through the openings 13 to form positive and negative terminals for the cells. The posts are sealed to the cell covers 12 by internal sealing rings 23 as of rubber between the bottom rim of the openings and respective flanges 21a and 22a on the posts, and by exterior sealing rings 24 clamped between the upper rim of the openings and metal washers 25 secured by nuts 26 threaded onto the terminal posts. The internal structures of the cells need not be further described for purposes of the present invention.

Each side wall of the cell cases has a pair of spaced vertical ribs 27 and 28 which are complementarily shaped with respect to each other. Further, the ribs are arranged so that those directly opposite to each other on the two side walls of a case are complementarily shaped. Thus, when the cell cases are set side-by-side against each other in a row the ribs 27 and 28 on the adjacent cases will inter-engage to interlock the cells into a rigid structure so long as the cells are held against one another in a block arrangement.

The successive cells are oriented in the block arrangement so that the terminal posts opposite to each other of adjoining cells are of opposite polarity. The successive pairs of terminal posts of adjacent cells are interconnected by metal straps 29 having apertured end portions which fit onto the posts and are secured thereto by nuts 30 which clamp the straps against the nuts 26. These straps serve not only to connect the successive cells electrically in a series arrangement but also to connect the cells together mechanically.

A feature of the invention resides in providing the front and back walls of the cell cases with undercut edges 31 and 32 along side corner edges of the cells. The undercut edges are preferably formed by providing the cells with ribs 33 and 34 on the front and back walls at the corner edges of the cells. These ribs have side surfaces opposite the corner edges of the cells which are undercut to form catch surfaces open at the ends. The two adjacent ribs 33 and 34 of adjoining cells at each breakline between the cells are bridged by a clasp 35 having hooked-shaped side flanges 35a which interlock with the catch surfaces of the respective ribs in a tight engagement to clamp the adjoining cells together as the clasps are pressed onto the ribs. Preferably, the ribs 33 and 34 have an extended length running from the top of the cells through about half the height thereof, and the clasps 35 have a bar shape to extend throughout the length of the ribs. The upper ends of the clasps have inwardly turned lugs 35b which abut against the upper ends of the ribs 33 and 34 as the clasps are pressed downwardly in place whereby to serve as stop members for the clasps. After the clasps are mounted, lugs 35c at the bottom may be bent inwardly to secure the clasps in place.

On the end walls of the block of cells are handle structures 36. These handle structures comprise metal plates 37 which have side flanges 38 provided with inwardly bent hooks 39 that engage the ribs 33 and 34 on the end walls. The handle structures are pressed in place from the top, with the hooks of the flanges slidably engaging the catch surfaces 31a and 32a of the ribs 33 and 34. After the handles are mounted, lugs 37c at the bottom are bent inwardly to engage the bottom edges of the ribs 33 and 34 so that the handles can carry the weight of the battery. The plates 37 extend upwardly beyond the side flanges 38 thereof and are provided with handle openings 40 adapted to receive the four fingers of the hand as the handles are grasped. The uppermost edge 37a of each plate is curled downwardly and a wall portion 37b of the plate is lanced and curled upwardly to meet the curled portion 37a so that each handle has a rounded formation above the handle opening.

It will be seen from the foregoing disclosure that in accordance with the present invention batteries of any desired number of individual cells can be assembled readily into a rigid unitary structure to meet varied commercial requirements. The particular embodiment of the invention herein shown and described is intended however to be illustrative and not necessarily limitative of the invention since the same is subject to changes and modifications without departure from the scope of my invention, which I endeavor to set forth according to the following claims.

I claim:

1. A battery comprising a preselected number of individual cells each having a case separate from the other and of a rectangular shape as viewed from the top permitting a plurality of cells to be set side-by-side against each other in a row, the contiguous walls of said cells in said row being complimentarily shaped throughout the height of the cells causing the cell cases to interlock with each other, the exterior side walls of the cases of the respective cells in said row having ribs along the adjacent corners thereof extending only through the upper portion of the cells, said ribs having vertically extending undercut side edges along the lengths thereof, and a strap-like clasp having hook-shaped flanges along the opposite sides thereof pressed downwardly onto each pair of adjacent ribs of adjoining cells in said row in interlocking engagement with the undercut side edges thereof for rigidly connecting the cells together into a unitary structure, each of said clasps having a pair of inwardly extending stop lugs at the top thereof abutting against top surfaces of the adjacent ribs to locate the clasps on said ribs.

2. The battery set forth in claim 1, including handles secured to the end walls of the cells of said row, each of said handles comprising a portion adapted to be grasped by the hand and a lower plate portion spanning the end wall of the cell, said plate portions having side flanges embracing the outer ribs at the corners of the cell row and provided with hook-shaped edges along the lengths thereof slidably interlockingly engaging the undercut side edges of said ribs, said side flanges having inwardly extending lugs at the bottom thereof engaging the bottom surfaces of said outer ribs to secure the handles for carrying the weight of the battery.

References Cited

UNITED STATES PATENTS 3,167,458   1/1965   Brazell _____ 136—166
3,338,452   8/1967   Oakley et al. _____ 136—166

FOREIGN PATENTS 840,476   7/1960   Great Britain.

OTHER REFERENCES

Jache, German printed specification 1,065,044, published Sept. 10, 1959.

Paul, German printed specification 1,174,859, published July 30, 1964.

WINSTON A. DOUGLAS, Primary Examiner

D. L. WALTON, Assistant Examiner

U.S. Cl. X.R.

136—171